(12) United States Patent
Keip (10) Patent No.: US 6,981,483 B1
(45) Date of Patent: Jan. 3, 2006

(54) LINEAR GEAR TRANSFER DRIVE ASSEMBLY

(76) Inventor: Charles P. Keip, 1052 Byron Rd., Byron Center, MI (US) 49315

( * ) Notice: Subject to any disclaimer, the term of this patent is extended or adjusted under 35 U.S.C. 154(b) by 153 days.

(21) Appl. No.: 10/700,268

(22) Filed: Nov. 4, 2003

Related U.S. Application Data (60) Provisional application No. 60/427,057, filed on Nov. 18, 2002.

(51) Int. Cl.
*F02B 75/32* (2006.01)
(52) U.S. Cl. ........................................ 123/197.1; 74/29
(58) Field of Classification Search ............ 123/197.1, 123/197.5; 74/25, 29, 30

See application file for complete search history.

(56) References Cited

U.S. PATENT DOCUMENTS

| 1,567,172 A | 12/1925 | Powell |
| 2,482,136 A | 9/1949 | Wright |
| 4,791,894 A | 12/1988 | White |
| 4,907,548 A | 3/1990 | Lee |
| 5,233,949 A | 8/1993 | Rucker |
| 5,394,839 A | 3/1995 | Haneda |

*Primary Examiner*—Noah P. Kamen
(74) *Attorney, Agent, or Firm*—Harpman & Harpman (57) ABSTRACT

A gear drive assembly for internal combustion and heat engines requiring the conversion and transfer of reciprocal linear powered motion input into undirectional rotary output. A rack and pinion assembly having linear power input on the rack and a one-way friction clutch engageable by a pinion gear coupled with a concentric movement cam ring. Cam followers on the rack drive the linear motion input on its return non-power stroke imparting enhanced momentum input thereto.

9 Claims, 8 Drawing Sheets

LINEAR GEAR TRANSFER DRIVE ASSEMBLY

This application claims the benefit of Provisional Application No. 60/427,057, filed Nov. 18, 2002.

BACKGROUND OF THE INVENTION

1. Technical Field

This invention relates to internal combustion engines and heat engines of the type that require the transfer of reciprocating movements of the piston into rotary output. Specifically, the invention is directed to enhance the efficiency of conversion to linear to rotation motion.

2. Description of Prior Art

Prior art devices have been directed to a variety of reciprocating piston engine designs and assemblies for transferring reciprocating output into effective usable rotary motion, see for example U.S. Pat. Nos. 1,567,172, 2,482, 136, 4,791,894, 4,907,548, 5,233,949 and 5,394,839.

In U.S. Pat. No. 1,567,172 an internal combustion engine is disclosed having a pivoted lever output assembly enhancing the effective crank stroke. An alternate form of the invention is also shown having a piston rod and a guide with a tooth portion engaging a geared segment mounted on a pin for an effective gear transfer.

U.S. Pat. No. 2,482,136 claims an engine having a coordinating mechanism for synchronization and rotation of a power shaft in an engine configuration.

U.S. Pat. No. 4,791,894 is directed to a reciprocating piston engine having an elongated gear roller and gear pinion mechanism to improve power transfer efficiency.

U.S. Pat. No. 4,907,548 claims a two-stroke cycle engine with linear gear drive. Counterweights are employed on the output shaft for enhanced performance.

Finally, an internal combustion engine is illustrated in U.S. Pat. No. 5,394,839 having piston rods connected to an eccentric rotary member within a large housing. A balance weight extends from each housing for offset and to supply smooth torque transitions.

SUMMARY OF THE INVENTION

The invention is directed to a gear drive transfer assembly to convert non-rotating drive input from a linear reciprocating source to usable rotational output with reduced loss of transfer energy. Internal combustion engines and compressors and other piston driven heat engine configurations that heretofore produce rotary output via reciprocating pistons and crank rods which never apply full torque transfer due to the connecting rod angle which have induced return stroke loss due to their power generating nature. The invention utilizes contoured cam surface on the drive shaft and cam followers that apply force to a piston rod rack during the non-powered return stroke and disengage during the power stroke utilizing the inherent kinetic energy within the components. This allows for maximum transfer of linear motion to torque by maintaining the optimum torque transfer relationship of pinion gear orientation to piston rack.

DESCRIPTION OF THE PREFERRED EMBODIMENT

Figure 1:
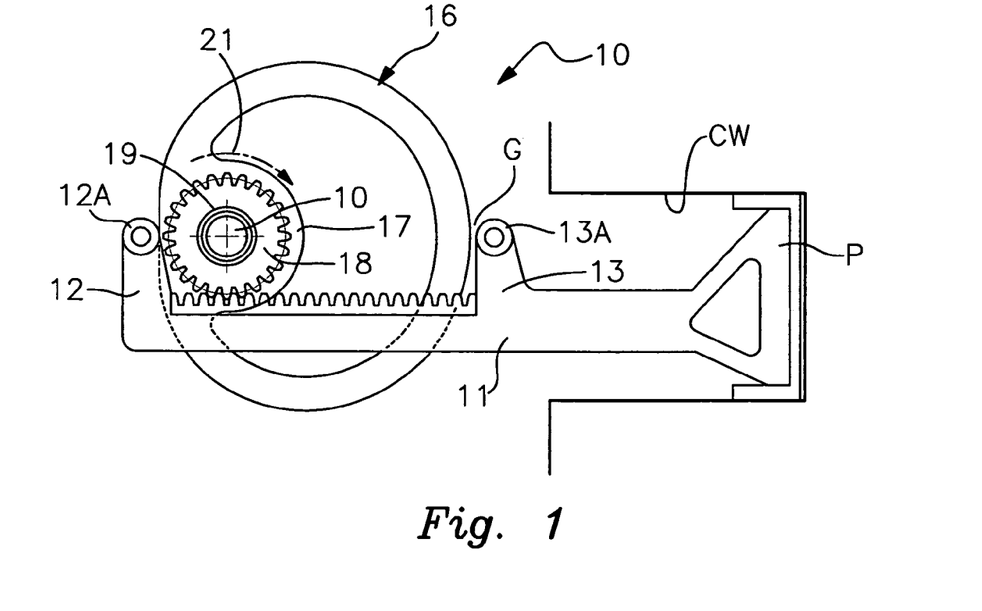
FIG. 1 is a side elevational view of a graphic representation of the linear gear transfer drive assembly within a power stroke requirement for an internal combustion engine.
Figure 2:
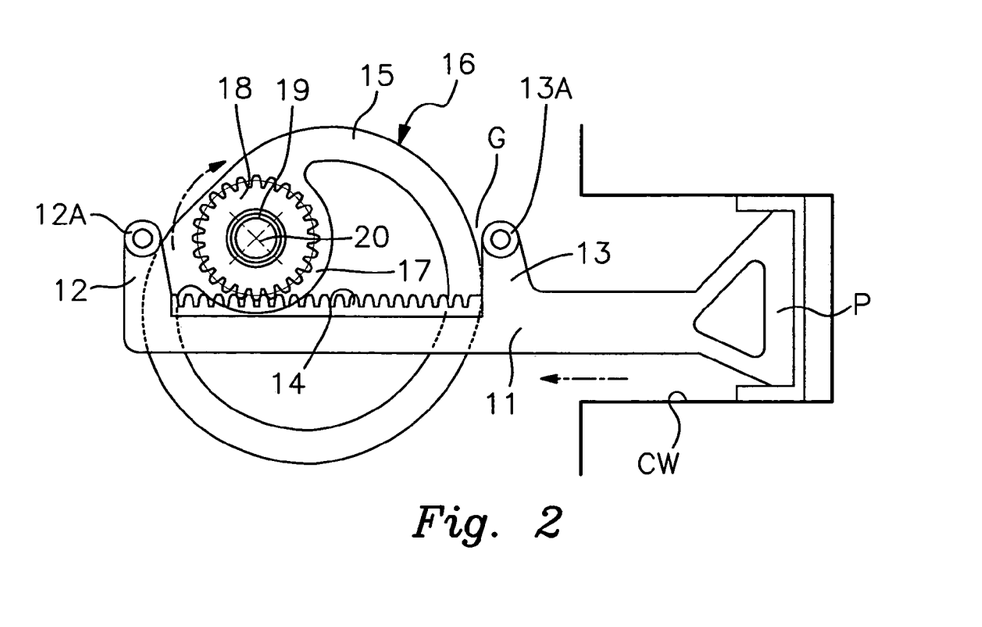
FIG. 2 is a side elevational view set forth in FIG. 1 illustrating the progressive cam relation position.
Figure 3:
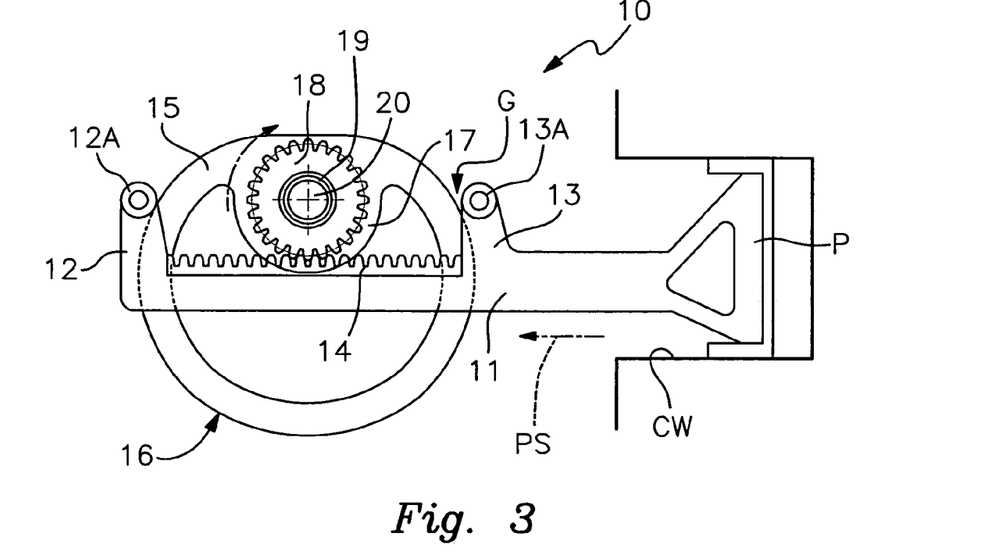
FIG. 3 is a side elevational view set forth in FIG. 1 illustrating the progressive cam relation position.

Referring to FIG. 1 of the drawings, a primary gear transfer drive assembly 10 of the invention can be seen having a linear drive input rack 11 with oppositely disposed spaced upstanding arms 12 and 13 extending there from. A gear surface 14 extends along the surface between said respective arms. Each of the arms 12 and 13 have cam roller follower assemblies 12A and 13A respectively thereon for selective engagement with a camming element 15.

The camming element 15 has a contoured outer engagement surface 16 with an integral apertured mounting lug 17 within an area defined by the camming engagement surface 16. A pinion gear 18 is positioned on a torque transfer drive assembly 19, illustrated generally in FIG. 5 of the drawings. A corresponding output drive shaft 20 extends through the bearing assembly 19 being selectively engaged thereby for rotary drive output as indicated by the directional arrow 21. The cam 15 is selectively engaged by the drive shaft for imparting return force to the drive input rack 11 as will be discussed in greater detail hereinafter.

Figure 4:
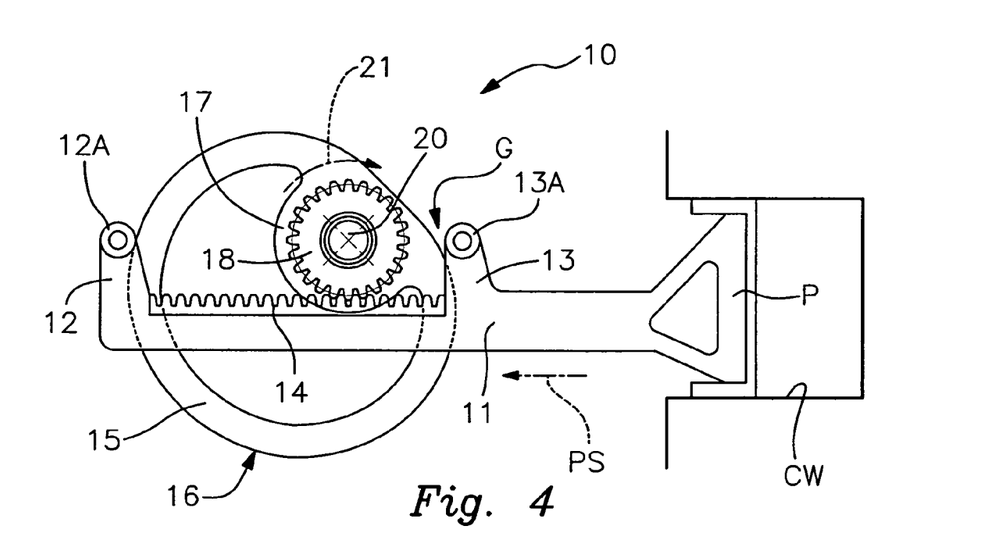
FIG. 4 is a side elevational view set forth in FIG. 1 illustrating the progressive cam relation position.
Figure 5:
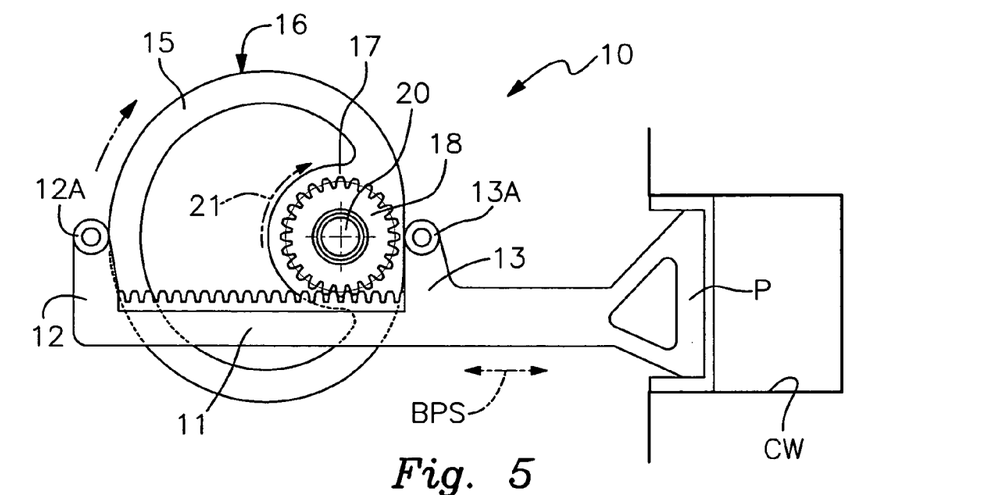
FIG. 5 is a side elevational view set forth in FIG. 2 at the end of the power stroke.
Figure 6:
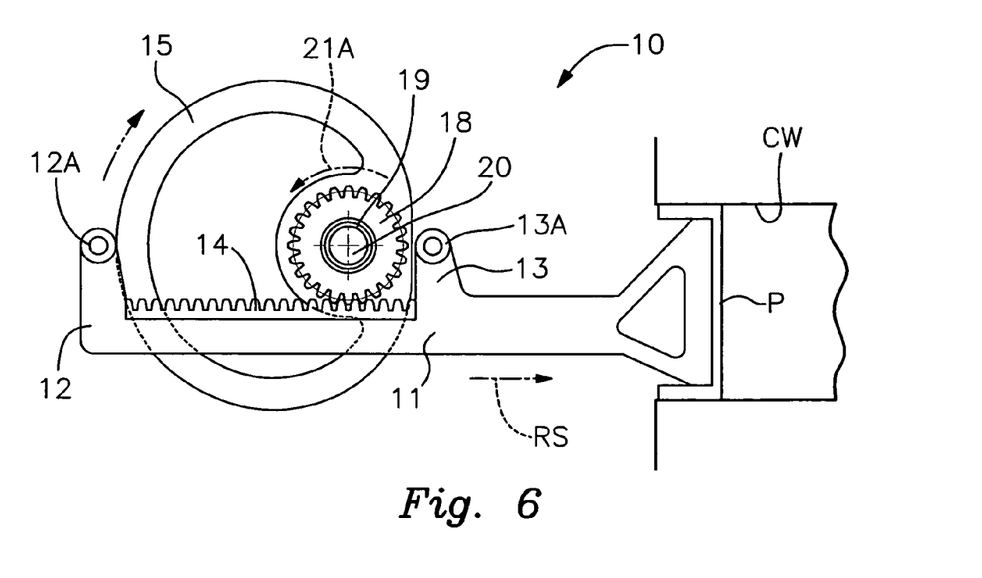
FIG. 6 is the side elevational view set forth in FIG. 2 within the return piston stroke sequence.
Figure 7:
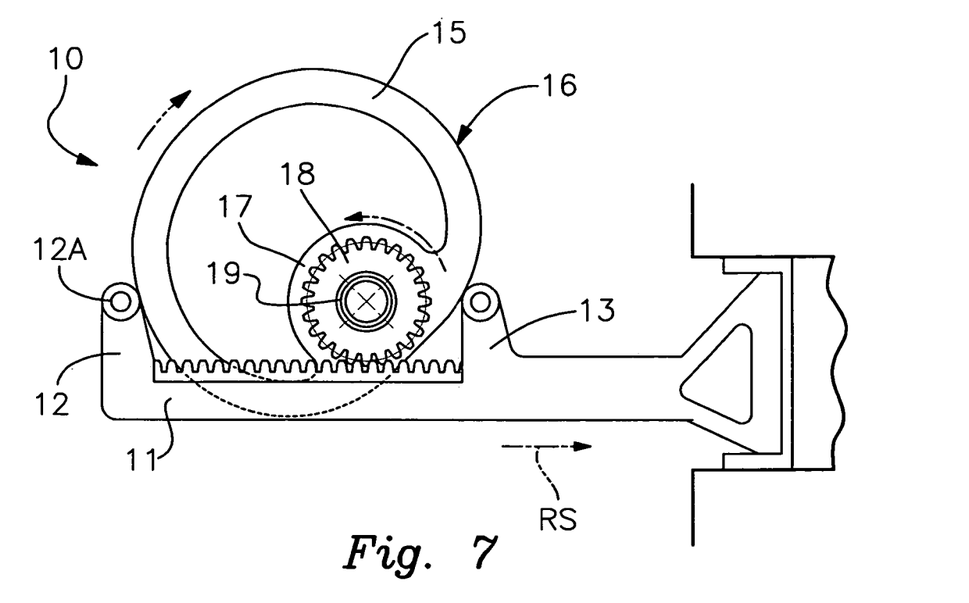
FIG. 7 is the side elevational view set forth in FIG. 2 within the return piston stroke sequence.
Figure 8:
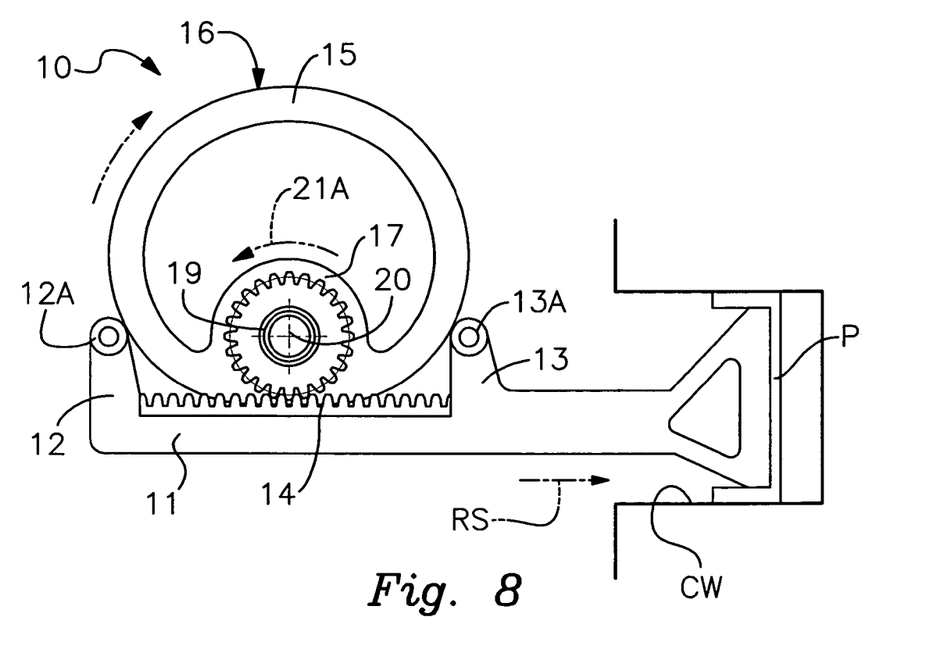
FIG. 8 is the side elevational view set forth in FIG. 2 within the return piston stroke sequence.
Figure 9:
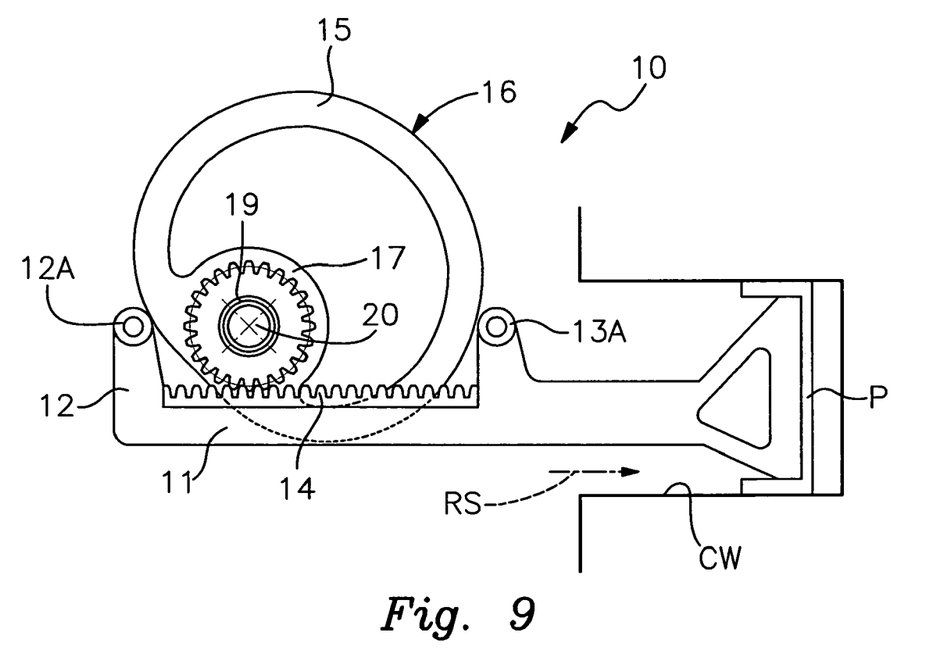
FIG. 9 is the side elevational view set forth in FIG. 2 within the return piston stroke sequence.
Figure 10:
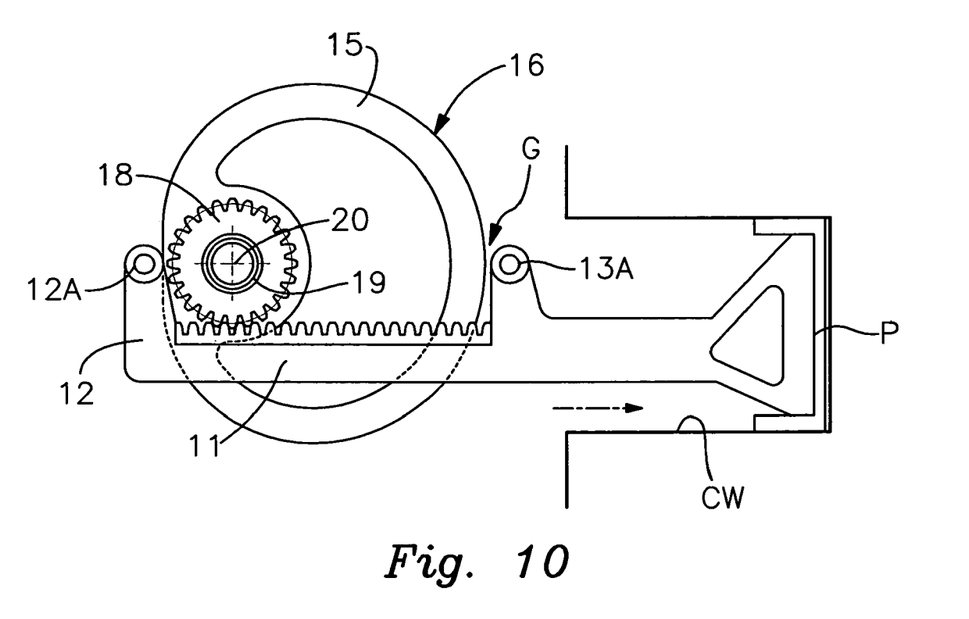
FIG. 10 is the side elevational view set forth in FIG. 2 within the return piston stroke sequence.

Referring to FIGS. 1–4 of the drawings, a sequential path of the camming element 15 and a piston P can be seen illustrating a power stroke PS in which cam follower 13A is not in contact i.e. gap G with the cam surface 16 to reduce potential loss. In FIG. 5 both cam followers 12A and 13A are engaged by the cam surface 16 at the bottom of the power stroke BPS. The linear force input of the rack 11 drives the pinion gear 18 in a clockwise motion locking the one-way bearing and clutch assembly 19 and correspondingly rotating the drive shaft 20 for power drive output transfer. The non-power return of the rack 11 is illustrated in FIGS. 6–10 sequentially in which the torque transfer assembly under counter-clockwise rotation arrow 21A imparted thereto disengages from the pinion gear 18 allowing free rotation of same.

As the cam 15 continues to rotate clockwise with the drive shaft 20 under the initial power input via the torque transfer assembly 19 from the pinion gear 18, the cam followers 12A and 13A on the ends of the respective upstanding arms 12 and 13 are driven thereby imparting input force to the rack's 11 non-powered return path. This action utilizes the kinetic energy within the cam element's 15 mass and therefore provides increased input to the return stroke overcoming the inherent torque loss between the piston and cylinder walls CW in a reciprocation directional pinion gear transfer power assembly heretofore.

Figure 11:
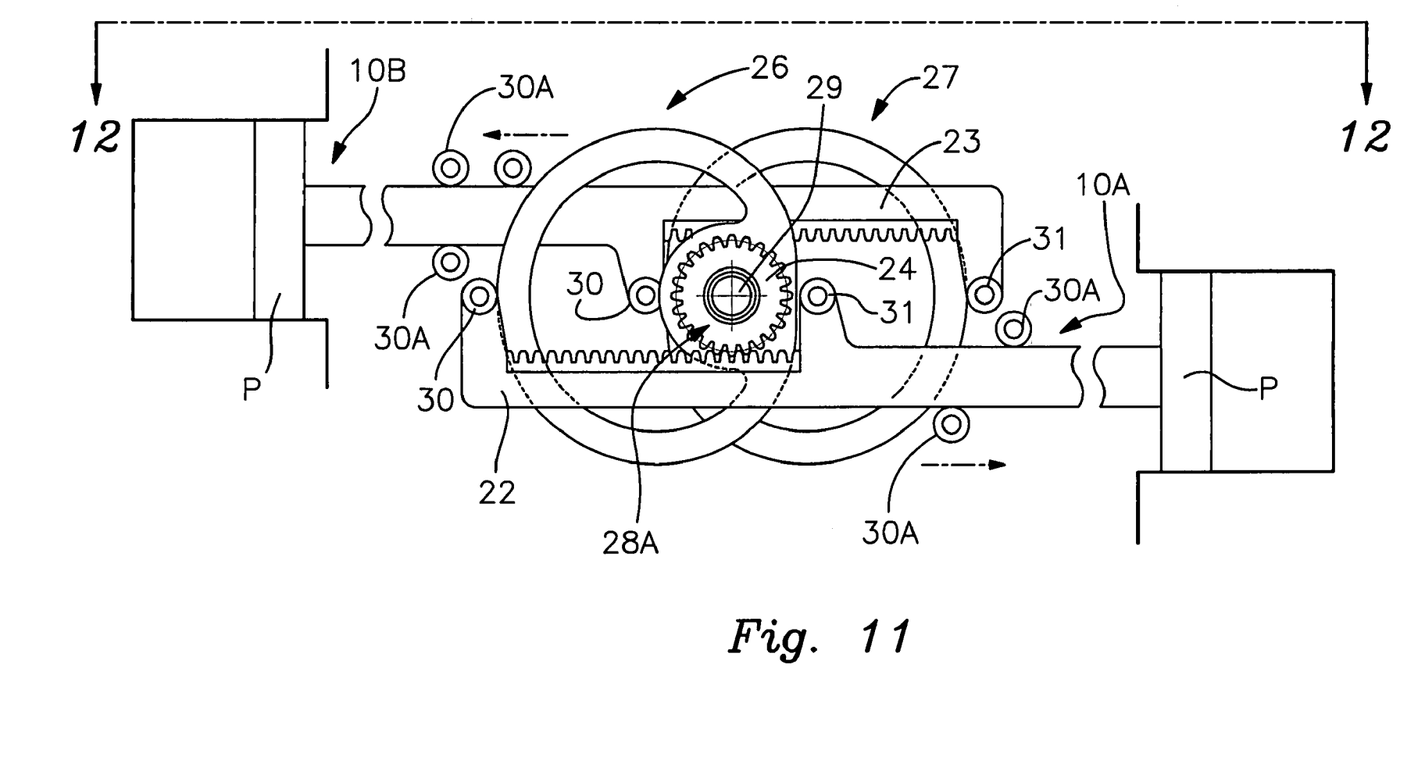
FIG. 11 is a side elevational view of a graphic representation of the linear gear transfer drive assembly of the invention in use.
Figure 12:
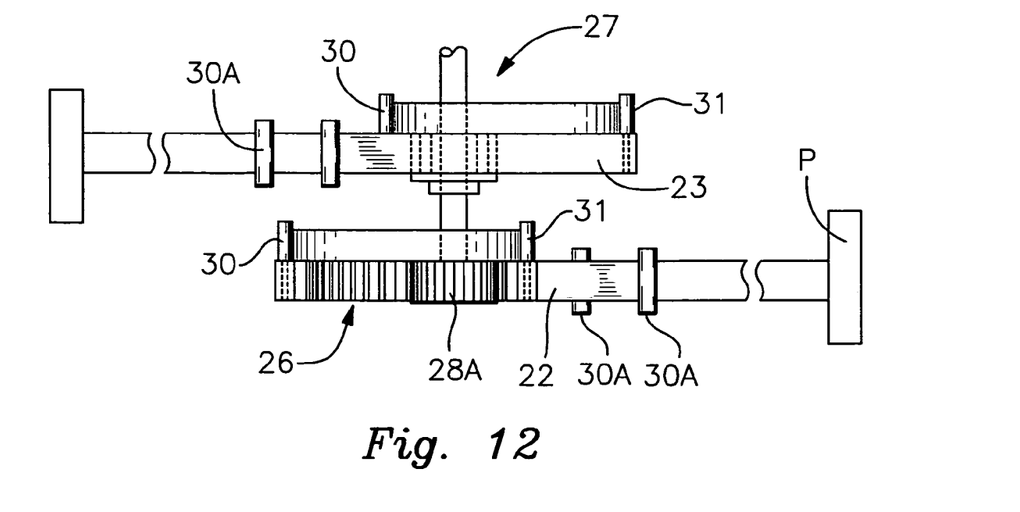
FIG. 12 is a top plan view on lines 12—12 of FIG. 11.
Figure 13:
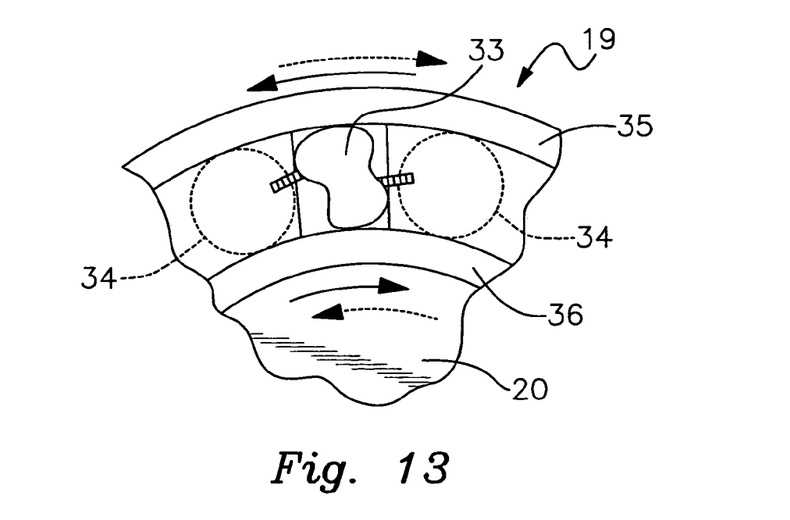
FIG. 13 is an enlarged partial side elevational view of a one-way bearing and clutch assembly used with the invention.

The primary application of the gear transfer device assembly 10 of the invention is for an internal combustion engine having opposing gear transfer drive assemblies 10A and 10B as illustrated generally in FIGS. 11 and 12 of the drawings in which a pair of piston rod racks 22 and 23 are interconnected to respective pinion gears 24 and 25 and interconnected cam assemblies 26 and 27. The pinion gears 24 and 25 have respective torque transfer assemblies 28A and 28B selectively engaging an output drive shaft 29 operating as hereinbefore described. Cam follower pairs 30 and 31 are selectively engaged on the respective cam elements 26 and 27 in the same manner as noted above. The respective piston rod racks 22 and 23 are simultaneously driven with the efficient torque transfer of reciprocating linear motion into directional rotation of the drive shaft 29. Roller bearings 30A are used to maintain piston rod racks 22 and 23 in contact alignment within the assembly.

It will be noted that the respective cam followers 12A and 13B and cam follower pairs 30 and 31 all selectively engage the respective cam elements 15, 26 and 27 fully during the return, non-power stroke, and correspondingly disengage marginally during the power stroke as illustrated in sequence in FIGS. 1–5. It is this disengagement which is critical to the system operation without same the cam configuration surface 16 which has been selected for optimum energy return input would not be viable.

The torque transfer assemblies 19, 28A and 28B are well known within the art and in this example utilize a plurality of cam clutches 33 and standard ball bearings 34. Such torque transfer assemblies are manufactured for example by Morris under Series KK35 as illustrated generally in FIG. 5 of the drawings as will be well understood by those skilled in the art. Such cam clutches 33 allow an outer race 35 over running, non-driven transfer to an inner race 36 on the respective output drive shafts 20 and 29 as best seen in FIG. 4 of the drawings.

Figure 14:
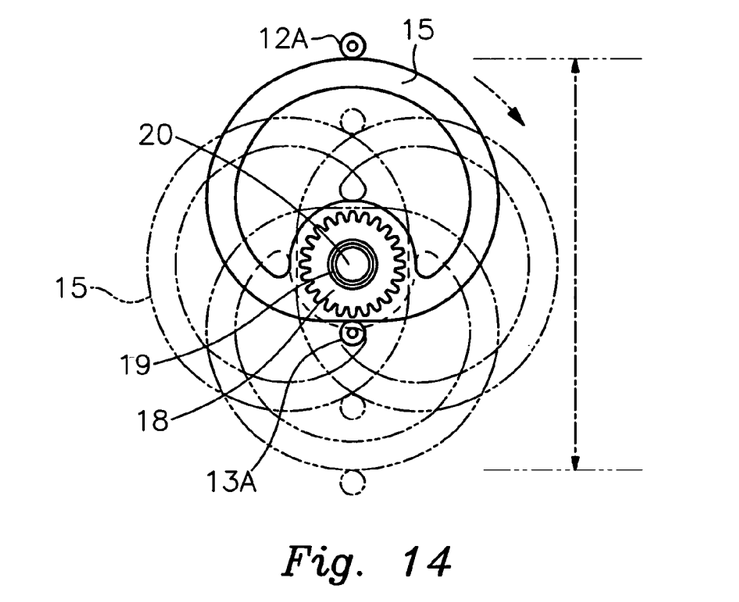
FIG. 14 is a side elevational view of the cam configuration of the invention illustrating its rotational positioning in broken lines.

The cam elements 15, 26 and 27 directionally rotate through a full 360 degree pattern as illustrated in FIG. 14 of the drawings in which the primary position and engagement of the cam element 15 is shown in solid lines and the incremental 90 degree positioning of the cam is illustrated in broken lines along with the cam followers 12A and 13A which, as noted, impart a return force every other stroke which is evident from the above description.

As noted above, during the power stroke of the respective geared racks 11, 22 and 23, the interengaged cam followers 12A, 13A and cam follower pairs 30 and 31 will momentarily disengage due to their fixed linear spacing to one another and the variable contoured engagement surface of the cam elements as hereinbefore described and best illustrated in FIGS. 1–4 of the drawings.

It will be evident from the above descriptions that it is the cam element 15 configuration and its positioning on the drive shaft 29 that affords the utilization of available return stroke energy imparted during the reciprocating action of the power input thereon that provides the torque transfer and increase enhanced efficiency associated therewith as discussed will be applicable to any piston derived system in which reciprocating linear motors is to be converted to rotary output.

Figure 15:
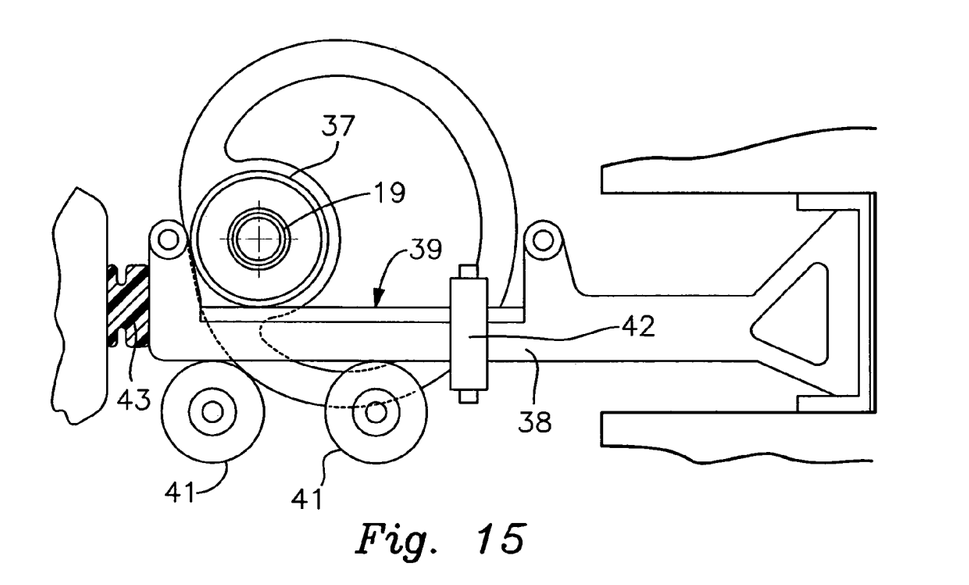
FIG. 15 is a side elevational view of a modified graphic representation of the linear gear transfer assembly within a power stroke sequence for an internal combustion engine.

Referring to FIG. 15 of the drawings, an alternate form of the invention can be seen in which a transfer roller 37 is rotatably positioned on the torque transfer drive assembly 19. Correspondingly, a linear drive input rack 38 is shown having a roller engagement surface 39 which is frictionally engaged by the roller 38 under substantial torque transfer force affecting a linear to rotational motion transfer.

As set forth in the primary form of the invention, the roller 37 is mounted on a torque transfer drive assembly 40. A plurality of pressure rollers 41 are positioned for force engagement on the linear drive input rack 38 opposite that of said transfer roller 37. Secondary guide rollers 42 are engaged in oppositely disposed sides of the input rack 38 to stabilize and maintain required linear transfer travel path. Additionally, a resilient bumper 43 may be positioned within the assembly so as to be engageable by free end surface 44 of the input rack 38 to cushion the rack 38 at the end of its power stroke.

In some applications, it may be necessary to provide dual gear transfer drive assemblies attached to a single piston input source which would require to duplicate the transfer drive assembly 10 attached to the piston P of the appropriate configuration of engine, compressor or the like that derives its power from reciprocating linear sources.

It will be apparent to those skilled in the art that various changes and modifications may be made therein without departing from the spirit of the invention.

Therefore I claim:

1. A heat engine having linear piston rod movement with enhanced energy transfer to rotational output comprises,
   a drive transfer assembly having at least one linear driven input rack,
   a piston interconnected to said input rack,
   said piston reciprocately moves within a cylinder,
   at least one rack engagement means registerable on said input rack,
   at least one output drive shaft rotatably carried by at least one one-way torque transfer means within said rack engagement means,
   at least one camming element on said output drive shaft, said camming element having an engagement surface,
   cam followers extending from said input rack selectively engaging said camming element.

2. The heat engine set forth in claim 1 wherein said rack engagement means comprises a pinion gear.

3. The heat engine set forth in claim 1 wherein said camming element is driven by said drive shaft imparting return linear force to said input rack via said respective cam followers.

4. The heat engine set forth in claim 1 wherein an eccentricity of the camming element engagement surface on said cam followers imparts a return torque transfer to said input rack during a non-powered linear return path.

5. The heat engine set forth in claim 1 wherein said linear driven input rack has frictional engagement surface formed thereon and resilient engagement means registerable with said linear drive input rack.

6. A heat engine set forth in claim 1 wherein said rack engagement means registerable on said input rack comprises a frictional roller engaging a registerable surface on said input rack under bi-lateral pressure.

7. The heat engine set forth in claim 1 wherein said piston interconnection to said input rack is in longitudinal axial forced transfer alignment with said pistons for reduced angular force displacement of said pistons within said cylinders.

8. The heat engine set forth in claim 1 wherein said linear driven input rack further comprises, a motion transfer friction engagement surface on said rack for engagement by said rack engagement means.

9. The heat engine set forth in claim 1 wherein said rack engagement means further comprises, a friction roller assembly on said torque transfer means for engagement with said motion transfer frictional engagement surface on said linear driven input rack.

* * * * *